(12) United States Patent
Gross et al.

(10) Patent No.: US 6,480,854 B1
(45) Date of Patent: Nov. 12, 2002

(54) METHOD AND APPARATUS FOR INCREASING DATABASE AVAILABILITY

(75) Inventors: Danny B. Gross, Austin, TX (US); Michael R. Conboy, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/536,501

(22) Filed: Mar. 27, 2000

(51) Int. Cl.[7] ............................................... G06F 17/30
(52) U.S. Cl. ................................. 707/10; 707/3; 707/2; 707/103
(58) Field of Search ............................... 707/3, 103, 10

(56) References Cited

U.S. PATENT DOCUMENTS

| | | | | |
|---|---|---|---|---|
| 5,696,962 A | * | 12/1997 | Kupiec | 707/4 |
| 5,987,446 A | * | 11/1999 | Corey et al. | 707/3 |
| 6,078,914 A | * | 6/2000 | Redfern | 707/3 |
| 6,202,067 B1 | * | 3/2001 | Blood et al. | 707/10 |
| 6,339,767 B1 | * | 1/2002 | Rivette et al. | 707/2 |

* cited by examiner

*Primary Examiner*—Frantz Coby
(74) *Attorney, Agent, or Firm*—Williams, Morgan & Amerson, P.C.

(57) ABSTRACT

A computer system includes a first database, a second database, and a data handler. The data handler is adapted to receive a database request, issue a first request to the first database, and issue a second request to the second database. The first and second requests are based on the database request. The data handler is further adapted to receive a first response from the first database, receive a second response from the second database, and ignore one of the first and second responses. A method for increasing database availability includes receiving a database request; issuing a first request to a first database; issuing a second request to a second database, the first and second requests being based on the database request; receiving a first response from the first database; receiving a second response from the second database; and ignoring one of the first and second responses.

25 Claims, 3 Drawing Sheets

METHOD AND APPARATUS FOR INCREASING DATABASE AVAILABILITY

BACKGROUND OF THE INVENTION

1. Field of the Invention

This invention relates generally to computer systems, and, more particularly, to a method and apparatus for increasing database availability.

2. Description of the Related Art

Many computer systems employ centralized data storage services to improve efficiency and ease of access. Centralized data storage allows user on various parts of the system simultaneous access to the data. Also, centralized data stores are easier to back up and maintain. One type of computer system that uses centralized data storage is a manufacturing control system, such as a semiconductor manufacturing system. Characteristics of various lots of wafers are tracked. Data in the centralized data store is used to control the flow of lots though the manufacturing process, measure the performance of various tools and processes in the system, and provide statistical data for process control and optimization.

A significant aspect of the manufacturing process is process control. In particular, the fabrication tools and the fabrication environment are routinely controlled to achieve a satisfactory process. Certain operational parameters may be monitored and, when desired, the tool's operation can be altered to improve the process to yield more or better wafers.

One problem associated with a centralized data store arises directly from its centralized nature. If the computer in the system that manages the data store fails, the entire system may be compromised or shut down entirely. As a result of this single point of failure, a data store outage might result in extended system outages, lost data, or data corruption.

The present invention is directed to overcoming, or at least reducing the effects of, one or more of the problems set forth above.

SUMMARY OF THE INVENTION

One aspect of the present invention is seen in a computer system including a first database, a second database, and a data handler. The data handler is adapted to receive a database request, issue a first request to the first database, and issue a second request to the second database. The first and second requests are based on the database request. The data handler is further adapted to receive a first response from the first database, receive a second response from the second database, and ignore one of the first and second responses.

Another aspect of the present invention is seen in a method for increasing database availability. The method includes receiving a database request; issuing a first request to a first database; issuing a second request to a second database, the first and second requests being based on the database request; receiving a first response from the first database; receiving a second response from the second database; and ignoring one of the first and second responses.

BRIEF DESCRIPTION OF THE DRAWINGS

The invention may be understood by reference to the following description taken in conjunction with the accompanying drawings, in which like reference numerals identify like elements, and in which.

Figure 1:
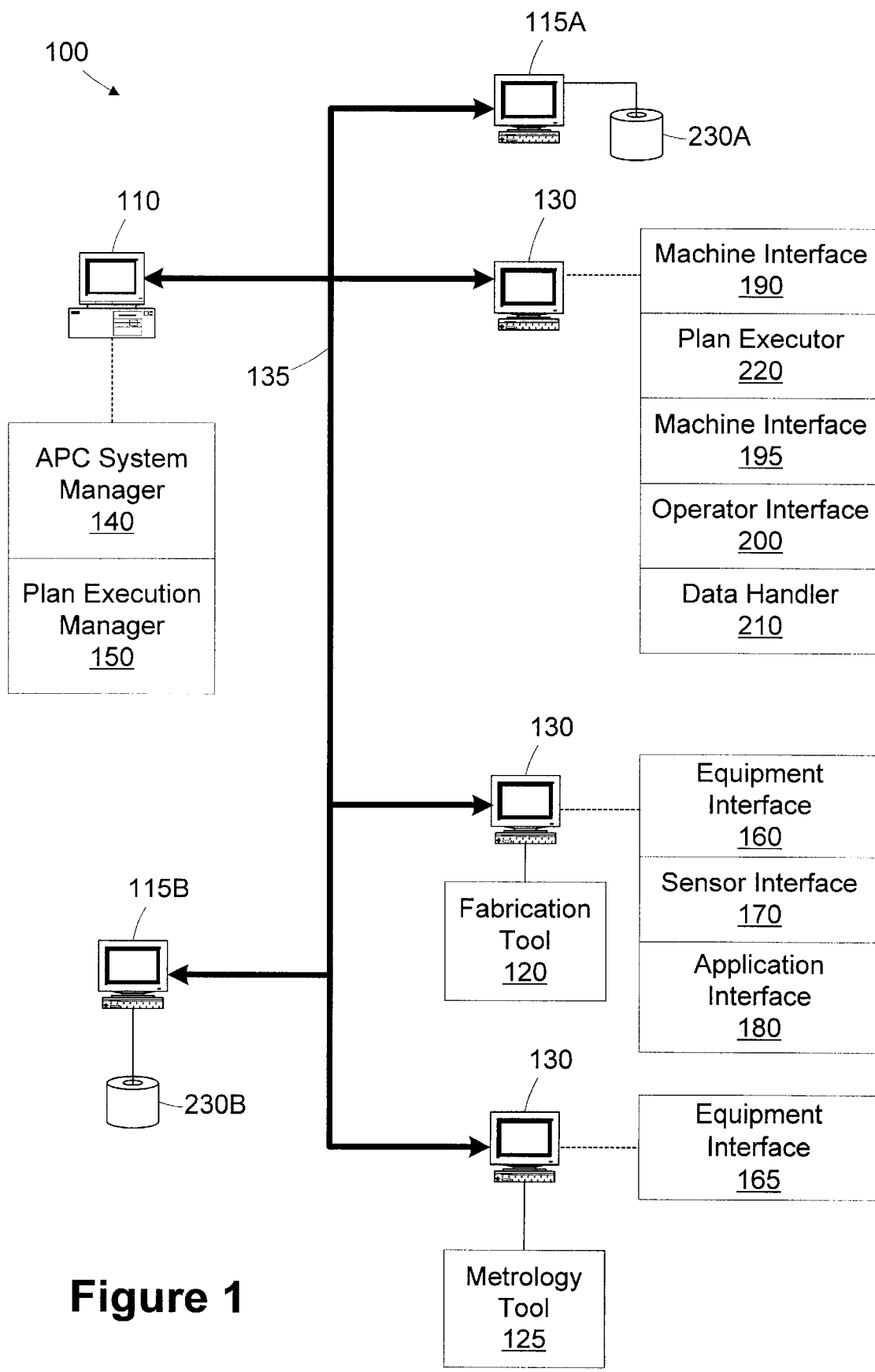
FIG. 1 is a simplified block diagram of an advanced process control system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the figures, and, first to FIG. 1, a simplified block diagram of an advanced process control (APC) system 100. The APC System 100 comprises a distributed software system of interchangeable, standardized software components permitting run-to-run control and fault detection/classification. The software components implement an architectural standard based on the Semiconductor Equipment and Materials International (SEMI) Computer Integrated Manufacturing (CIM) Framework compliant system technologies and the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI. This particular architecture relies heavily on software utilizing object oriented programming and employs the Object Management Group's (OMG) Common Object Request Broker Architecture (CORBA) and CORBA_Services specifications for distributed object systems. Information and specifications for the OMG CORBA architecture are also readily, publicly available. An exemplary software system capable of being adapted to perform the functions of the APC system 100 as described herein is the ObjectSpace Catalyst system offered by ObjectSpace, Inc.

The components communicate with each other using the CORBA Interface Definition Language (IDL) interfaces and rely on a common set of services to support their interaction. A standard set of distributed-object services are defined by the OMG. Among these services are:

CORBA—the standard-based communications protocol used for all direct component-to-component interaction. Standard interfaces can be defined according to an object-oriented, remote invocation communications model. These interfaces and all APC communications are defined using IDL. Components communicate by invoking operations on each others interfaces. Data is passed between components as operation parameters and return values.

OMG Event Service—supports asynchronous communications between components. Many of the APC objects emit events as they change state. These events are received by interested event subscribers. Examples of event usage within the APC system include, but are not limited to, communication component state (including error state), notification of fault alarms detected by fault detection and classification software, and reporting of machine status and collected data.

OMG Trading Service—enables a component to find another component with which to interact. When a component is installed, a description of its services (a services offer) is exported to the Trading Service. Another component can later request a list of service providers that meet certain criteria. The Trading Service supplies a list of other components that can provide the requested service. That capability is used upon component startup to allow one component to find other components with which it must interact. It is also used upon Plan Startup when a Plan Execution component needs to find Capability Providers to provide the required capabilities specified in the plan.

These services are well known in the art. OMG's CORBA/IIOP Specifications document and CORBA Services Specifications documents are widely distributed among those in the art and provide greater detail.

In the illustrated embodiment, the APC system 100 is adapted to control a semiconductor manufacturing environment. The components communicate with each other using CORBA Interface Definition Language (IDL) interfaces. The cooperating software components manage process control plans/strategies; collect data from process equipment, metrology tools, and add-on sensors; invoke various process control applications/algorithms with this information; and update process models and modify/download tool operating recipe parameters as appropriate.

In an exemplary implementation, the APC system 100 includes an APC host computer 110, redundant database servers 115A, 115B, a fabrication tool 120, a metrology tool 125, and one or more workstations 130. The components of the APC system are interconnected through a bus 135. The bus 135 may actually include multiple layers and use multiple protocols. Overall operation APC system 100 is directed by an APC system manager 140 resident on an APC host computer 110. The APC system manager 140 provides administrative, configuration, event, and state services for all servers developed for the APC Framework; definition, grouping, installation, and management of the components in the APC system 100; centralized services for capturing activity and trace information for diagnostic and monitoring purposes; a centralized repository of component configuration information, including setup values, system environment settings; and lists of dependent objects and event channels. However, in alternative embodiments, these functions may be divided into one or more software components, e.g., a base manager, a system manager, a logger, and a registry.

The APC system 100 includes a network of processing modules. These processing modules are sometimes referred to as "integration components." Integration components serve as interfaces to existing factory systems and provide capabilities for running APC Plans. An "APC Plan" is an application program called to perform some specific task, as is discussed more fully below. The integration components are shown as they might be hosted by the various processing resources within the APC system 100. These specific hosting locations are provided for exemplary purposes. The processing resources are interconnected, and the various software components may be either distributed among the various computers or centralized, depending on the complexity of the system. The integration components include, but are not limited to, the APC system manager 140; a plan execution manager 150; equipment interfaces 160, 165 associated with the tools 120, 125; a sensor interface 170 associated with the fabrication tool 120; an application interface 180; machine interfaces 190, 195; an operator interface 200; and a data handler 210.

Each of the integration components in this particular embodiment, are software-implemented. They are programmed in C++ using object-oriented programming techniques as are known in the art. An advantage of the APC system 100 is its modular structure, which provides portability of software components.

The plan execution manager 150 is the component primarily responsible for "choreographing" the operation of the APC System 100. The plan execution manager 150 interprets APC plans, executes main scripts and subscripts, and invokes event scripts as events dictate. A variety of plans, scripts, and subscripts may be used in various implementations. The specific number and function of various plans, scripts, and subscripts will be implementation specific. For instance, the present embodiment includes, but is not limited to, the following plans:

a data collection plan—a data structure used by sensor and machine interfaces defining the requirements for what data should be collected from a specific processing equipment, and how that data should be reported back;

a duration plan—a plan that defines trigger conditions and trigger delays that cause sensors to act, e.g., start data collection, stop data collection;

a reporting plan—a plan that defines what to do with the collected data, as well as when to signal the data's availability; and a sampling plan—a plant that defines the frequency at which the data is to be collected by an external sensor.

The plan execution manager 150 coordinates the execution of user-defined process control plans among all the integration components for a given fabrication tool, such as the tool 120. When instructed, the plan execution manager 150 retrieves a plan and its associated scripts. It preprocesses subscripts to provide routines to main and event scripts. It also obtains a list of the capabilities necessary to execute the plan, as specified in the plan and connects to the proper integration components providing the required capabilities.

The plan execution manager 150 then delegates responsibility to run the plan to a plan executor 220. In the illustrated embodiment, plan executors 220 are created by the plan execution manager 150 to sequentially execute the plan and report completion of the plan or errors in the execution of the plan to the plan execution manager 150. Thus, while the plan execution manager 150 is responsible for the overall management of all plans executed, each plan executor 220 is responsible for running only one plan. The plan executor 220 is created by the plan execution manager 150, exists for the life of the plan, and is destroyed by the plan execution manager 150 after reporting that the plan is completed or aborted. Each plan executor 220 executes a main script and zero or more event scripts. The plan execution manager 150 can start multiple plans concurrently via multiple plan executors.

The machine interfaces 190, 195 bridge the gap between the APC framework, e.g., the APC system manager 140, and the equipment interfaces 160, 165. The machine interfaces 190, 195 interface the processing or metrology tools 120, 125 with the APC framework and support machine setup, activation, monitoring, and data collection. In this particular embodiment, the machine interfaces 190, 195 primarily translate between specific communications of the equipment interfaces 160, 165 and CORBA communications of the APC framework. More particularly, the machine interfaces 190, 195 receive commands, status events, and collected data from the equipment interfaces 160, 165 and forward as needed to other APC components and event channels. In turn, responses from other APC components are received by the machine interfaces 190, 195 and routed to the equipment interfaces 160, 165. The machine interfaces 190, 195 also reformat and restructure messages and data as necessary. The machine interfaces 190, 195 support the startup/shutdown procedures within the APC System Manager 140. They also serve as APC data collectors, buffering data collected by the equipment interfaces 160, 165 and emitting appropriate data collection events.

The sensor interface 170 and the application interface 180 collect data generated by the sensors monitoring the operation of the fabrication tool 120. The sensor interface 170 provides the appropriate interface environment to communicate with external sensors, such as LabVIEW® or other sensor, bus-based data acquisition software. The application interface 180 provides the appropriate interface environment to execute control plug-in applications such as LabVIEW, Mathematica, ModelWare, MatLab, Simca 4000, and Excel. The sensors may be supplied with the fabrication tool 120 by the original equipment manufacturer (OEM) or they may be "add-on" sensors installed subsequent to acquisition from the OEM. The sensor interface 170 collects data generated by add-on sensors and the application interface 180 collects data generated by OEM sensors. The sensors may generate data on, for instance, the pressure and temperature of the operating conditions. The plug-in applications collect the data from the sensors and transmit it to the application interface 180. The machine interface 190, the application interface 180, and the sensor interface 170 use a common set of functionality to collect data to be used. The equipment interface 160 gathers the respective data collected by the application interface 180 and the sensor interface 170. The equipment interface 160 then transmits the gathered data to the machine interface 190.

The operator interface 200 facilitates communication between a wafer fabrication technician and the APC system 100 via a graphical user interface (GUI) (not shown). The GUI may be a Windows® or Linux based operating system. However, this is not necessary to the practice of the invention. Indeed, some alternative embodiments might not even employ a GUI and may communicate through a disk operating system (DOS) based operating system. The operator interface 200 displays dialogue boxes to provide information, request guidance and collect additional data. Through a CORBA interface, the operator interface 200 component allows technicians to display a variety of popup dialogs simultaneously on any number of display groups. The operator interface 200 also maintains a group of displays in which a popup could appear. The operator interface 200 may also provide an announcement operation, i.e., a one-way message that displays a simple popup with message and "OK" button.

The data handler 210 receives data generated by other APC system 100 components and stores the data in redundant data stores 230A, 230B (e.g., relational databases) on the database servers 115A, 115B. The data handler 210 may be adapted to receive standard structured query language (SQL) commands, or alternatively, the data handler 210 may translate a different type of access protocol to generate a SQL command or some other protocol command. Centralizing the data storage functions increases the portability of the various components.

In the particular embodiment illustrated, the APC system 100 is a factory-wide software system, but this is not necessary to the practice of the invention. The control strategies taught by the present invention can be applied to virtually any semiconductor fabrication tool on a factory floor. Indeed, the present invention may be simultaneously employed on multiple fabrication tools in the same factory or in the same fabrication process. The APC framework permits remote access and monitoring of the process performance. Furthermore, by utilizing the APC framework, data storage can be more convenient, more flexible, and less expensive than with local drives. However, the invention may be employed, in some alternative embodiments, on local drives.

Figure 2:
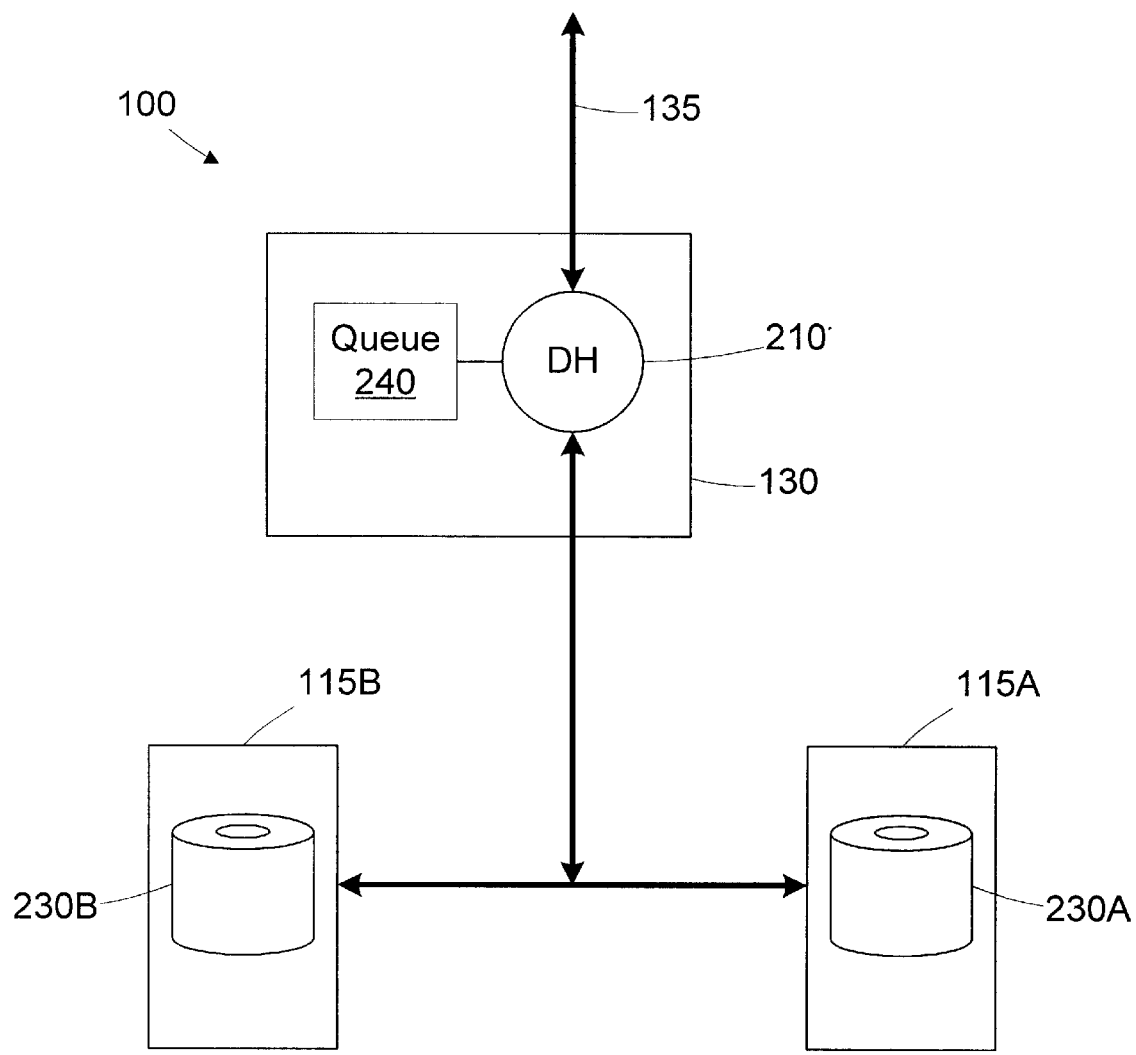
FIG. 2 is a simplified functional diagram of a portion of the advanced process control system of FIG. 1.

Turning now to FIG. 2, a simplified functional diagram of a portion of the advanced process control (APC) system 100 is provided. As indicated above, the particular processing resources that host the described integration components may vary. In the illustrated embodiment, the data handler 210 is not hosted by either of the database servers 115A, 115B to keep the data handler 210 independent. The data handler 210 receives database commands over the bus 135. The data handler 210 issues two identical commands to the redundant databases 230A, 230B (i.e., with the exception of the address). In the illustrated embodiment, the commands issued to the databases 230A, 230B use a structured query language (SQL) format, although other formats may be used.

If both database servers 115A, 115B are operational, the data handler 210 should receive two replies. The reply might consist of data (ie., if the command was a query) or a confirmation that the command was processed (i.e., if the command was to write data to the database 230A, 230B). If the data handler 210 detects two responses, it assumes that both databases are operating correctly, discards one of the responses, and forwards the other response to its destination.

However, if one of the databases 230A, 230B is not operational (e.g., its server 115A, 115B has failed), the data handler 210 receives only one response. Based on receiving only one response, the data handler 210 determines which of the databases 230A, 230B did not respond and flags it as down. For illustrative purposes, assume that the database 230A has failed to respond to the command of the data handler 210. The data handler 210 starts a restoration queue 240 for the failed database 230A to allow subsequent updating of the data therein when the database 230A comes back on line. The data handler 210 stores the current failed transaction and all subsequent transactions that could result in a change to the data in the database 230A in the restoration queue 240.

At some later point in time, the failed database 230A may come back on line. The return of the failed database 230A may be detected when the data handler 210 again receives two responses to its commands. Alternatively, the data handler 210 might be informed of the return of the failed database 230A through a message from a system operator. Due to its absence, the failed database 230A is potentially no longer synchronized with the other database 230B. The data handler 210 discards the response from the failed database 230A and proceeds to resynchronize its contents by issuing it the commands previously stored in the restoration queue 240. If additional commands come through during the resynchronization, the data handler 210 adds them into the restoration queue 240 and continues ignoring the responses from the database 230A until it has been completely updated.

In another embodiment, the data handler 210 does not store subsequent commands in the restoration queue 240. Instead, the data handler 210 sends a message to the system operator indicating the failure of the database 230A. Any responses from the database 230A that are subsequently received are ignored. The system operator would investigate the failure of the database 230A, correct the problem, manually synchronize the failed database 230A with the other database 230B, and inform the data handler 210 that the database 230A is again operational.

Figure 3:
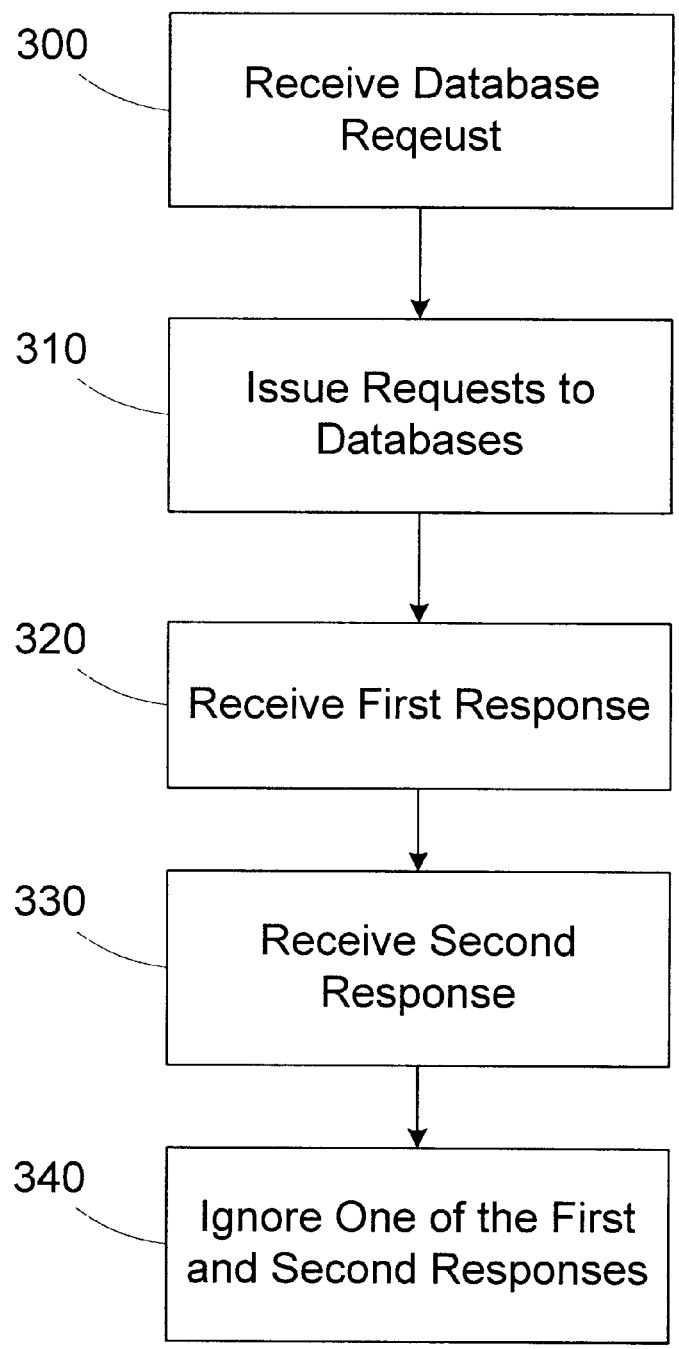
FIG. 3 is a flow diagram of a method for increasing database availability.

FIG. 3 is a flow diagram of a method for increasing database availability. In block 300, a database request is received. Requests are issued to the databases 230A, 230B in block 310. The requests are based on the database request. In block 320, a first response is received from the first database 230A, and in block 330, a second response is received from the second database 230B. In block 340, one of the first and second responses is ignored. Operating redundant databases 230A, 230B as described above has numerous advantages. First, the availability of the databases 230A, 230B is inherently increased due to their redundant nature. Second, storing the pending transactions in the restoration queue 240 allows easy resynchronization when the failed database returns. It is possible to resynchronize without requiring a time-consuming recopying of the entire database.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer system, comprising:
   a first database;
   a second database, the second database being synchronized with the first database; and
   a data handler adapted to receive a database request, issue a first request to the first database, issue a second request to the second database, the first and second requests being identical and based on the database request, receive a first response from the first database, receive a second response from the second database, and ignore one of the first and second responses.

2. The computer system of claim 1, wherein the data handler is adapted to identify one of the first and second databases as failed in response to not receiving one of the first and second responses.

3. The computer system of claim 2, wherein the data handler is adapted to ignore any subsequent responses from the failed one of the first and second databases.

4. The computer system of claim 2, wherein the data handler is adapted to determine a return of the failed one of the first and second databases and update the returned one of the first and second databases.

5. The computer system of claim 4, further comprising a restoration queue, wherein the data handler is adapted to store subsequent requests in the restoration queue.

6. The system of claim 5, wherein the data handler is adapted to read the requests stored in the restoration queue and issue corresponding requests to the returned one of the first and second databases.

7. The computer system of claim 5, wherein the data handler is adapted to read the requests stored in the restoration queue and issue corresponding requests to the returned one of the first and second databases.

8. The computer system of claim 2, wherein the data handler is adapted to ignore any subsequent responses from the failed one of the first and second databases until receiving a message indicating the operability of the failed one of the first and second databases.

9. The computer system of claim 1, further comprising:
   a first computer adapted to host the data handler;
   a second computer adapted to host the first database; and
   a third computer adapted to host the second database.

10. The method of claim 2, further comprising ignoring any subsequent responses from the failed one of the first and second databases until receiving a message indicating the operability of the failed one of the first and second databases.

11. A computer system, comprising:
    a message bus;
    a first computer adapted to issue a database request on the message bus;
    a first database server coupled to the bus and adapted to host a first database;
    a second database server coupled to the bus and adapted to host a second database, the second database being synchronized with the first database; and
    a data handler coupled to the bus and adapted to receive the database request, issue a first request to the first database, issue a second request to the second database, the first and second requests being identical and based on the database request, receive a first response from the first database, receive a second response from the second database, forward one of the first and second responses to the first computer, and ignore the other of the first and second responses.

12. The computer system of claim 11, wherein the data handler is adapted to identify one of the first and second databases as failed in response to not receiving one of the first and second responses.

13. The system of claim 12, wherein the data handler is adapted to ignore any subsequent responses from the failed one of the first and second databases.

14. The system of claim 12, wherein the data handler is adapted to determine a return of the failed one of the first and second databases and update the returned one of the first and second databases.

15. The system of claim 14, further comprising a restoration queue, wherein the data handler is adapted to store subsequent requests in the restoration queue.

16. The system of claim 12, wherein the data handler is adapted to ignore any subsequent responses from the failed one of the first and second databases until receiving a message indicating the operability of the failed one of the first and second databases.

17. The system of claim 11, further comprising a third computer adapted to host the data handler.

18. A method for increasing database availability, comprising:
    receiving a database request;
    issuing a first request to a first database;

issuing a second request to a second database, the second database being synchronized with the first database and the first and second requests being identical and based on the database request;

receiving a first response from the first database;

receiving a second response from the second database; and ignoring one of the first and second responses.

19. The method of claim 18, further comprising identifying one of the first and second databases as failed in response to not receiving one of the first and second responses.

20. The method of claim 19, further comprising ignoring any subsequent responses from the failed one of the first and second databases.

21. The method of claim 19, further comprising:

determining a return of the failed one of the first and second databases; and updating the returned one of the first and second databases.

22. The method of claim 21, further comprising storing subsequent database requests in a restoration queue.

23. The method of claim 22, further comprising: reading the database requests stored in the restoration queue; and issuing corresponding requests to the returned one of the first and second databases.

24. A program storage device, comprising:

program instructions, that when executed by a processing device perform a method for increasing database availability, the method comprising:

receiving a database request;

issuing a first request to a first database;

issuing a second request to a second database, the second database being synchronized with the first database and the first and second requests being identical and based on the database request;

receiving a first response from the first database;

receiving a second response from the second database; and ignoring one of the first and second responses.

25. A computer system, comprising:

a first database;

a second database;

means for receiving a database request;

means for issuing a first request to the first database;

means for issuing a second request to the second database, the second database being synchronized with the first database and the first and second requests being identical and based on the database request;

means for receiving a first response from the first database;

means for receiving a second response from the second database; and means for ignoring one of the first and second responses.

* * * * *